United States Patent Office 3,194,738
Patented July 13, 1965

3,194,738
CHEWING GUMS AND DENTIFRICES CONTAINING ENZYMES
Jos. W. E. Harrisson, Lansdowne, and Elias W. Packman, Philadelphia, Pa., assignors to American Chicle Company, Long Island City, N.Y., a corporation of New Jersey
No Drawing. Filed Mar. 14, 1962, Ser. No. 179,770
16 Claims. (Cl. 167—93)

The present invention relates to improvements in oral and dental hygiene. More specifically, the invention relates to compositions in the form of mouth washes, toothpastes, tablets, chewing gums and the like, which are effective as cleansing agents for dental hygiene.

This application is a continuation-in-part application to our copending application Serial No. 855,017 filed November 24, 1959.

The problem of dental hygiene is one which over the past few years has commanded more and more attention from both medical authorities and the public generally. Significant strides have been made in this field within the last few years but the problems associated with dental hygiene and tooth decay are manifold and there is an ever increasing demand for toothpastes, chewing gums, etc. which will help control and alleviate these problems.

At the present time, the work in the field of oral hygiene is being directed to a considerable degree into two definite channels, i.e. the use of fluoride and the employment of anti-enzymes. Fluorides theoretically harden the surface enamel or by some other means prevent bacterial attack upon the enamel. The anti-enzymes are presumed to filter in, or seep into the plaques or food debris in which the destroying bacteria are afforded a galaxy of nutriments to support their destructive propensities. Or, they are presumed to attach themselves to clean tooth surfaces and thereby prevent the adherence of the destroying bacteria.

Neither of these approaches attempts to remove the supporting materials that enable the bacteria to exist and carry on their attack against the enamel or other organic constituents of the teeth. While there is no absolute agreement that any single type of food is a prime necessary substrate for these organisms, there is a general feeling that slowly soluble or poorly dispersible carbohydrates, proteins and possibly mucoproteins or polysaccharides play an important part. These food constituents attach themselves in sticky masses to the teeth or gums and are difficult to remove, thereby affording the initial focal point for rapid growth and the development of an environment in which the tooth is capable of being attacked. It thus appears that a "clean mouth" is less likely to develop a high incidence of caries or other oral disturbances.

However, it seems that nature intended that considerable carbohydrate conversion, at least from the sticky-gummy starch or dextrin like materials to more soluble materials, should go on within the oral cavity. Therefore, if salivary amylolytic activity could be maintaned after consumption of foods, it would assist greatly towards supporting a clean oral cavity. Concurrent proteolytic activity that would aid in removing proteinaceous foods or in breaking carbohydrate-protein linkages would also assist in maintaining a clean tooth.

Considering the practical needs, it appears that any means that would lessen the extraneous carbohydrate or protein attachment to the teeth or gums may well support a cleaner and more healthful oral cavity. Mechanical brushing does not alone do this, and while chewing gum may reach areas and particles not attacked by brushing, there usually still remains a residue.

It is, therefore, an object of this invention to provide novel chewing gums, toothpastes, tablets, mouth washes, etc. which will aid in maintaining clean oral cavity.

It is another object of this invention to provide improved novel compositions with ingredients which will aid in the conversion of masses of attached carbohydrate or protein to more freely movable and easily cleaned forms.

It is another object of this invention to provide novel compositions that will attack plaque calculus and other material already adhering to the tooth surfaces, and afford a degree of protection against the formation of calculus.

These and other objects of the invention will appear from the following description.

According to this invention there are provided compositions active in the oral cavity comprising enzyme compositions of fungal origin of particular character and activity to be described hereinafter. These enzyme compositons are incorporated in the oral compositions of this invention, i.e. toothpastes, chewing gums, mouth washes, tablets, etc. as an active ingredient and thus aid in maintaining a clean oral cavity. These enzyme compositions are standardized in accordance with procedures discussed hereinafter and the standardized material may be referred to as single strength. As it is more practical to use a high activity material, theses enzymes are generally used at a higher activity than single strength, for example, a factor of 3 or 4 times the single strength material may be used. Where the enzyme activity is less than the single strength, the amount employed is increased in proportion to the decreased activity. Enzyme compositions of greater activity may be employed and when used the amounts as employed are in proportion to the increased activtiy. The amount of enzyme composition that is to be employed will depend upon the particular medium in which it is incorporated. However, generally the enzyme compositions will be present in an amount of about 0.1 to 6.0 percent and preferably about 0.4 to 4 percent, based upon single strength activity of the enzyme compositions as described hereinafter and based upon the total weight of the ingredients.

The enzyme compositions employed in this invention are of fungal origin, and are active over the pH range 3–10 but generally are most active over the pH range 5–8. By the preferred procedure, the microorganism that may be selected from the *Aspergillus oryze-niger* group, or from a species of Aspergillus such as *Aspergillus oryze*, e.g. such as the microorganism filed in the American Type Culture Collection in Washington, D.C. under catalogue No. 14,605, is grown on a moist nutrient medium. Suitable media include crushed or broken grain from which, preferably, part of the starchy material has been removed, including brans, shorts and middlings, preferably from wheat, at temperatures from 15° to 35° C. and preferably between 20 to 30° C. In addition to wheat products, there may be used materials from rice, corn, oats, barley and the like, while there may be added to such materials if desired, fatty glycerides, such as olive oil, linseed oil, shark oil, etc. or seeds with high oil content such as soya bean.

Nutrient media are prepared by mixing the crushed or broken grain in the water. Mixtures containing from 45% to 65% moisture are generally suitable depending upon the specific materials used. It is advisable, though not essential, to sterilize the mixture by heating to eliminate bacetria and fungi which may chance to be present. The mixture is then inoculated with a heavily spored culture of the microorganism, preferably 0.01 to 0.10 of the culture medium by weight, and the inoculated medium maintained within the temperature range specified for about 48 to 144 hours until an enzyme composition can be separated that has the desired activity as measured by standard procedures which are discussed in greater detail hereinafter.

After an enzyme composition of desired activity has been obtained, growth is interrupted by drying the medium, preferably below 60° C. Alternatively the medium may be extracted and the extract used as the source of the enzyme composition. Alternatively the enzymes present in the extract may be precipitated as by the addition of a water miscible, volatile, organic solvent such as ethyl alcohol, isopropanol or acetone. The precipitated product may be dried, if desired, particularly when it is to be stored. The exact procedure to be followed will of course depend to some extent upon the oral composition into which the enzyme composition is to be incorporated.

More detailed descriptions for the preparation of enzymes are shown in "Enzyme Technology" in "The Enzymes" Part 2, Vol. II (1952) and in "Economic Botany," Vol. 5, No. 2, pages 126–144 (1951) in an article entitled "Microbiological Production of Enzymes and Their Industrial Applications." Convenient sources for fungal enzymes are shown in such art.

Typical enzyme compositions of single strength activity suitable for the purpose of this invention may be characterized as having the following minimum activities:

The enzyme compositions of single strength have a proteolytic activity as measured by its casein activity of not less than 2,000 units per gram; as measured by its hemoglobin activity of not less than 10,000 units per gram, and as measured by its gelatin viscosity activity of not less than 25,000 units per gram.

An enzyme composition has a casein activity of 1,000 units if 200 milligrams produce 69.4 milligrams soluble nitrogen, or if it solubilizes 750 milligrams of casein in one hour at 40° C. at a pH of 8.

Hemoglobin unit activity is defined in J.A.O.A.C. 44, 344 (1961).

Gelatin viscosity units are defined as 36 units causing a reduction of 50% in viscosity of a 6% gelatin solution (225 Bloom) in 30 minutes at 40° C. at a pH of 7 (Koch and Ferrari, Cereal Chemistry 32,254 (1955)).

The enzyme compositions used in the products of this invention also have an amylolytic activity as measured by the Sandstedt, Kneen and Blish Test, commonly called the SKB Test (Cereal Chemistry 16,712 (1939) Sandstedt, Kneen and Blish) of not less than 100 units per gram; and of not less than 500 starch liquefication units per gram as determined by the method of Borgpetty and Taylor in an article entitled "De-Sizing Procedure in Relation to Enzyme Activity" in American Dyestuffs, Vol. 44, No. 8, page 256 (1955).

The lipase activity of these enzyme compositions as measured by a simplified Triacetin Method (Jour. Bio. Chem., 122, 125 (1937) Balls, Matlach and Tucker) is not less than 10 units per gram.

Additional enzymatic activities are natural to such enzyme compositions and are concurrently present.

Finally, enzyme compositions suitable for use in the products of this invention have a ratio of casein unit activity to hemoglobin unit activity of not less than 1:3 and a ratio of SKB unit activity to starch liquefaction unit activity of not less than 1:2.

Enzyme products having these characteristics may be obtained from the Rohm & Haas Company of Philadelphia, Pennsylvania, and are sold commercially under the tradenames Rhozyme A–4 and Rhozyme P–11. Similar products may be obtained from other commercial sources. Rhozyme P–11 is characterized by a proteolytic activity of approximately 10,000 casein units per gram, about 40,000 hemoglobin units per gram and about 100,000 gelatin viscosity units per gram. It has an amylolytic activity of approximately 150 SKB units per gram and 850 starch liquefaction units per gram. Its lipase activity as measured by the Triacetin Method is approximately 25 units per gram. Rhozyme A–4 is characterized by a proteolytic activity of approximately 3,000 casein units per gram, about 50,000 hemoglobin units per gram and about 30,000 gelatin viscosity units per gram. It has an amylolytic activity of approximately 3,500 SKB units per gram and about 9,500 starch liquefaction units per gram. Its lipase activity as measured by the Triacetin Method is approximately 15 units per gram.

The following examples are illustrative of the procedures which may be employed to produce enzyme products suitable for use in the compositions of this invention.

EXAMPLE I

Approximately 200 parts by weight are taken of wheat bran and 100 parts of wheat middlings and are mixed with 400 parts of water. This mixture is then sterilized by heating and cooling. Thereupon, a heavily sporulated culture of Aspergillus oryzae having A.T.C.C. catalogue No. 14,605 in an amount equal to 0.1% by weight of the above mixture is thoroughly dispersed therein. The temperature is raised to 35° C. for 16 hours to promote rapid growth of the fungus and then held for 48 hours at 28° C. The culture is then dried in a current of warm air. This dry product is extracted with water. Four volumes of ethyl alcohol are added per volume of extract. The precipitate which results is centrifugally settled, rinsed with alcohol and dried in a current of warm air at 60° C. The enzyme product may then be employed in the compositions of this invention.

EXAMPLE II

A medium is prepared from 220 parts of bran, 100 parts of middlings, 12 parts of 50% lactic acid, and 454 parts of water. After this medium has been sterilized, it is cooled and mixed with about 0.1% of its weight of a well sporulated culture of Aspergillus oryzae having A.T.C.C. catalogue No. 14,605, heated at 35° C. for 16 hours, and maintained at about 30° C. for 49 hours. The moist mass is then extracted with water to give a solution of 7.5° Brix. Sodium sulfate is dissolvebd therein until 10% of the weight of the extract has been added Alcohol is added until about four volumes of alcohol is present for each volume of original extract. A precipitate forms which is separated and dried. The product will consist of enzymes carried in precipitated salt.

After the enzymes have been cultivated to the extent that they have the desired activity, they are incorporated in various oral compositions of this invention which may be illustrated by the following formulations. These formulations are only illustrative of the compositions of this invention and many modifications of these formulations will be apparent to those skilled in the art.

*Chewing gum*

A typical chewing gum may have the following formulation:

| | Percent |
|---|---|
| Gum base (natural and synthetic elastomers and fillers) | 20 to 35 |
| Sucrose | 50 to 70 |
| Glucose | 10 to 20 |
| Enzyme compositions | 0.4 to 2 |
| Flavor | Sufficient |

*Toothpaste*

A typical toothpaste may have the following formulation:

| | Percent |
|---|---|
| Polishing or abrasive agents | 40 to 60 |
| Excipients | 20 to 30 |
| Modifiers (thickening agents) | 0.5 to 3.0 |
| Detergents | 0.5 to 5.0 |
| Water | 10 to 20 |
| Enzyme compositions | 0.4 to 4.0 |
| Flavor and sweetening agents (natural or synthetic) | Sufficient |

The polishing or abrasive agents which may be employed are those suitable for dental preparations such as calcium carbonate, di-calcium phosphate, calcium phosphate, calcium sulfate, etc. Excipients such as glycerin, propylene glycol and sorbitol may be employed. Modifiers, which are employed as thickening agents, are exemplified by the natural gums such as tragacanth, karaya, carrageens, guar, etc., or the synthetic carboxymethyl cellulose, carbopol, etc. The detergents employed are exemplified by the alkali earth salts of the fatty acids, or their mono or di-glycerides, or suitable synthetic detergents.

The effectiveness of the oral compositions of this invention may be illustrated by the following examples which are intended to be illustrative of the invention only.

EXAMPLE III

A base toothpaste was prepared of a formulation such that abrasive and cleansing action would be minimized. This served as a control toothpaste. In addition, three other toothpastes of the same base formulation were prepared, each of which had incorporated therein an enzyme product.

These four toothpastes were then tested on four groups of people, having about 50 people in each group. Each group used the toothpaste for a 4–6 month period. The effectiveness of these pastes with respect to characteristics such as calculus, soft accretions and stains, were evaluated and the results are set forth in Table 1 below. These characteristics were noted for each person at the beginning and at the end of the tests and the comparative results were determined by observation.

The toothpaste composition employed in the test was as follows:

*Experimental toothpaste*

|  | Gms. |
| --- | --- |
| Dicalcium phosphate | 70 |
| Bentonite | 5 |
| Tragacanth | 0.1 |
| Water | 10 |
| Glycerin | 20 |
| Oil peppermint | 0.5 |
| Menthol | 0.02 |
| Saccharin sodium | 0.05 |
| Methyl paraben | 0.05 |
| Enzyme [1] | 0.110 |

[1] Paste A contains Rhozyme P-11 (Factor 3.85). B contains Rhozyme A-4 (Factor 2.5). C contains Pectinase-41 (Factor 6.9). D, no enzyme.

The results of these tests are indicated by means of a fraction in which the number of people showing improvement with respect to a particular characteristic is expressed as the numerator and the total number of people taking part in that particular test is expressed as the denominator. It will be noted that not every characteristic was able to be evaluated in each person in every group and, therefore, with respect to some characteristics only a part of the entire group was able to be evaluated.

TABLE 1.—CLINICAL RESULTS

|  | Paste | | | |
| --- | --- | --- | --- | --- |
|  | A | B | C | D |
| Number in group | 51 | 63 | 62 | 35 |
| Stains (including tobacco) improved | 33/51 | 19/63 | 12/62 | 4/35 |
| Soft accretions retarded | 34/51 | 36/63 | 14/62 | 4/35 |
| Calculus formation retarded | 28/51 | 17/63 | 14/62 | 4/35 |

It will thus be seen from the above table that patients using toothpaste containing an enzyme composition having the activity factors specified exhibited a cleaner oral cavity than those patients using a paste containing an enzyme composition of high cellulase activity (Pectinase-41) or a toothpaste containing no enzyme at all.

EXAMPLE IV

The clinical study referred to in Example I was expanded with respect to the number of people participating in the study and extended with respect to the period of time employed. The same four toothpaste formulations employed in Example I were also used in this clinical study.

In this study, the number of people participating approached 100 persons per group except with respect to the control group. Each group used the toothpaste for a 10 to 14 month period. The effectiveness of these pastes in retarding the deposition of calculus, soft accretions and tobacco stains were evaluated and the results are set forth in Table 2 below. These characteristics were noted for each person at the beginning and at the end of the test and the comparative results were determined by observation.

TABLE 2.—CLINICAL RESULTS

|  | Paste | | | |
| --- | --- | --- | --- | --- |
|  | A | B | C | D |
| Number in group | 98 | 117 | 91 | 68 |
| Stains (tobacco): | | | | |
| Retarded | 12/48 | 11/54 | 6/56 | 1/31 |
| No change | 36/48 | 43/54 | 9/56 | 30/31 |
| Soft accretions: | | | | |
| Retarded | 60/98 | 70/117 | 20/91 | 1/68 |
| No change | 38/98 | 47/117 | 71/91 | 67/68 |
| Calculus: | | | | |
| Retarded | 73/98 | 70/117 | 21/91 | 0/68 |
| No change | 25/98 | 47/117 | 70/91 | 68/68 |

The results of these tests are indicated by means of a fraction in which the number of people showing improvement with respect to a particular characteristic is expressed as the numerator and the total number of people taking part in that particular test is expressed as the denominator. It will be noted that not every characteristic, i.e. tobacco stains, was able to be evaluated in each person in every group, and, therefore, with respect to this characteristic, only a part of the group was evaluated.

It will thus be seen from the above table that patients using toothpastes containing enzyme compositions having the activity factors specified, exhibited a much cleaner oral cavity.

EXAMPLE V

A chewing gum containing no enzyme composition was prepared and employed as the control chewing gum. In addition, three other chewing gums of the same base formulation were prepared, each of which had incorporated therein an enzyme composition.

These four chewing gums were then tested on four groups of people. Each group used the chewing gum for about six months. The effectiveness of these chewing gums in retarding the deposition of stains, soft accretions and calculus were evaluated and the results are set forth in Table 3 below. These characteristics were noted for each person at the beginning and at the end of the test and the comparative results were determined by observation.

The chewing gum composition employed in this test was as follows:

*Chewing gum*

|  | Percent |
| --- | --- |
| Gum base | 28.3 |
| Sucrose | 56.2 |
| Glucose | 14 |
| Caramel paste | 0.7 |
| Enzyme [1] | 0.8 |

[1] Paste A contains P-11 (Factor 4.41). B contains Enzyme S (Factor 2.18). C contains Viokase (Factor 4). D, no enzyme.

The results of these tests are indicated by means of a fraction in which the number of people showing improvement with respect to a particular characteristic is expressed as the numerator and the total number of people taking part in that particular test is expressed as the denominator.

TABLE 3.—CLINICAL RESULTS

| | Chewing gum | | | |
|---|---|---|---|---|
| | A | B | C | D |
| Number in group | 36 | 14 | 13 | 32 |
| Stains: | | | | |
| Retarded | 26/36 | 6/14 | 4/13 | 7/32 |
| No change | 10/36 | 8/14 | 7/13 | 22/32 |
| Soft accretions: | | | | |
| Retarded | 20/36 | 5/14 | 4/13 | 6/32 |
| No change | 16/36 | 9/14 | 9/13 | 24/32 |
| Calculus: | | | | |
| Retarded | 22/36 | 6/14 | 4/13 | 6/32 |
| No change | 14/36 | 8/14 | 9/13 | 24/32 |

It will thus be seen from the above table that patients employing a chewing gum containing an enzyme composition having the activity factors specified (Gum A) exhibited a much cleaner oral cavity than those patients using chewing gums containing other enzyme compositions such as Enzyme composition S (Gum B) which although derived from fungal origin does not meet the specified activity factors, or Viokase (Gum C) which is of animal origin, or no enzymes (Gum D) at all.

Having thus provided a written description of the present invention and provided specific examples thereof, it should be understood that no undue restrictions or limitations are to be imposed by reason thereof but that the present invention is defined by the appended claims.

We claim:

1. A chewing gum comprising gum base, sweetening agents, flavoring agents and about 0.1 to about 6% by weight based upon single strength activity of enzyme products produced by inoculating a moist nutrient medium with a heavily sporulated culture of *Aspergillus oryzae*, and maintaining said inoculated medium at a suitable temperature for a suitable period of time and separating therefrom enzyme products having a proteolytic activity of not less than 2000 casein units per gram, not less than 10,000 hemoglobin units per gram, and not less than 25,000 gelatin viscosity units per gram and having an amylolytic activity of not less than 100 SKB units per gram and not less than 500 starch liquefaction units per gram and characterized by having a ratio of casein unit activity to hemoglobin unit activity of not less than 1:3 and a ratio of SKB unit activity to starch liquefaction unit activity of not less than 1:2.

2. A dentifrice composition comprising diluents, binders, excipients and about 0.1% to about 6% by weight based upon single strength activity of enzyme products produced by inoculating a moist nutrient medium with a heavily sporulated culture of *Aspergillus oryzae*, and maintaining said inoculated medium at a suitable temperature for a suitable period of time and separating therefrom enzyme products having a proteolytic activity of not less than 2000 casein units per gram, not less than 10,000 hemoglobin units per gram, and not less than 25,000 gelatin viscosity units per gram and having an amylolytic activity of not less than 100 SKB units per gram and not less than 500 starch liquefaction units per gram and characterized by having a ratio of casein unit activity to hemoglobin unit activity of not less than 1:3 and a ratio of SKB unit activity of starch liquefaction unit activity of not less than 1:2.

3. A chewing gum comprising gum base, sweetening agents, flavoring agents and about 0.1 to about 6% by weight based upon single strength activity of enzyme products produced by inoculating a moist nutrient medium with a heavily sporulated culture of *Aspergillus niger*, and maintaining said inoculated medium at a suitable temperature for a suitable period of time and separating therefrom enzyme products having a proteolytic activity of not less than 2000 casein units per gram, not less than 10,000 hemoglobin units per gram, and not less than 25,000 gelatin viscosity units per gram and having an amylolytic activity of not less than 100 SKB units per gram and not less than 500 starch liquefaction units per gram and characterized by having a ratio of casein unit activity to hemoglobin unit activity of not less than 1:3 and a ratio of SKB unit activity to starch liquefaction unit activity of not less than 1:2.

4. A dentifrice composition comprising diluents, binders, excipients and about 0.1% to about 6% by weight based upon single strength activity of enzyme products produced by inoculating a moist nutrient medium with a heavily sporulated culture of *Aspergillus niger*, and maintaining said inoculated medium at a suitable temperature for a suitable period of time and separating therefrom enzyme products having a proteolytic activity of not less than 2000 casein units per gram, not less than 10,000 hemoglobin units per gram, and not less than 25,000 gelatin viscosity units per gram and having an amylolytic activity of not less than 100 SKB units per gram and not less than 500 starch liquefaction units per gram and characterized by having a ratio of casein unit activity to hemoglobin unit activity of not less than 1:3 and a ratio of SKB unit activity to starch liquefaction unit activity of not less than 1:2.

5. A chewing gum comprising about 25 to 30% of a gum base including elastomers and fillers, about 60 to 90% sugars and corn syrup, flavoring agents and about 0.4 to about 4% by weight based upon single strength activity of enzyme products produced by inoculating a moist nutrient medium with a heavily sporulated culture of *Aspergillus oryzae*, and maintaining said inoculated medium at a suitable temperature for a suitable period of time and separating therefrom enzyme products having a proteolytic activity of not less than 2000 casein units per gram, not less than 10,000 hemoglobin units per gram, and not less than 25,000 gelatin viscosity units per gram and having an amylolytic activity of not less than 100 SKB units per gram and not less than 500 starch liquefaction units per gram and characterized by having a ratio of casein unit activity to hemoglobin unit activity of not less than 1:3 and a ratio of SKB unit activity to starch liquefaction unit activity of not less than 1:2.

6. A chewing gum comprising about 25 to 30% of a gum base including elastomers and fillers, about 60 to 90% sugars and corn syrup, flavoring agents and about 0.4 to about 4% by weight based upon single strength activity of enzyme products produced by inoculating a moist nutrient medium with a heavily sporulated culture of *Aspergillus oryzae*, and maintaining said inoculated medium at a suitable temperature for a suitable period of time and separating therefrom enzyme products having a proteolytic activity of about 10,000 casein units per gram, about 40,000 hemoglobin units per gram and about 100,000 gelatin viscosity units per gram and having an amylolytic activity of about 150 SKB units per gram and about 850 starch liquefaction units per gram and characterized by having a ratio of casein unit activity to hemoglobin unit activity of not less than 1:3 and a ratio of SKB unit activity to starch liquefaction unit activity of not less than 1:2.

7. A chewing gum comprising about 25 to 30% of a gum base including elastomers and fillers, about 60 to 90% sugars and corn syrup, flavoring agents and about 0.4 to about 4% by weight based upon single strength activity of enzyme products produced by inoculating a moist nutrient medium with a heavily sporulated culture of *Aspergillus oryzae*, and maintaining said inoculated medium at a suitable temperature for a suitable period of time and separating therefrom enzyme products having a proteolytic activity of about 3,000 casein units per gram, about 50,000 hemoglobin units per gram and about 30,000 gelatin viscosity units per gram and having an amylolytic activity of approximately 3,500 SKB units per gram and 9,500 starch liquefaction unit per gram and characterized by having a ratio of casein unit activity to hemoglobin unit activity of not less than 1:3 and a ratio of SKB unit activity to starch liquefaction unit activity of not less than 1:2.

8. A chewing gum comprising about 25 to 30% of a gum base including elastomers and fillers, about 60 to 90% sugars and corn syrup, flavoring agents and about 0.4 to about 4% by weight based upon single strength activity of enzyme products produced by inoculating a moist nutrient medium with a heavily sporulated culture of *Aspergillus niger*, and maintaining said inoculated medium at a suitable temperature for a suitable period of time and separating therefrom enzyme products having a proteolytic activity of not less than 2000 casein units per gram, not less than 10,000 hemoglobin units per gram, and not less than 25,000 gelatin viscosity units per gram and having an amylolytic activity of not less than 100 SKB units per gram and not less than 500 starch liquefaction units per gram and characterized by having a ratio of casein unit activity to hemoglobin unit activity of not less than 1:3 and a ratio of SKB unit activity to starch liquefaction unit activity of not less than 1:2.

9. A chewing gum comprising about 25 to 30% of a gum base including elastomers and fillers, about 60 to 90% sugars and corn syrup, flavoring agents and about 0.4 to about 4% by weight based upon single strength activity of enzyme products produced by inoculating a moist nutrient medium with a heavily sporulated culture of *Aspergillus niger*, and maintaining said inoculated medium at a suitable temperature for a suitable period of time and separating therefrom enzyme products having a proteolytic activity of about 10,000 casein units per gram, about 40,000 hemoglobin units per gram and about 100,000 gelatin viscosity units per gram and having an amylolytic activity of about 150 SKB units per gram and about 850 starch liquefaction units per gram and characterized by having a ratio of casein unit activity to hemoglobin unit activity of not less than 1:3 and a ratio of SKB unit activity to starch liquefaction unit activity of not less than 1:2.

10. A chewing gum comprising about 25 to 30% of a gum base including elastomers and fillers, about 60 to 90% sugars and corn syrup, flavoring agents and about 0.4 to about 4% by weight based upon single strength activity of enzyme products produced by inoculating a moist nutrient medium with a heavily sporulated culture of *Aspergillus niger*, and maintaining said inoculated medium at a suitable temperature for a suitable period of time and separating therefrom enzyme products having a proteolytic activity of about 3,000 casein units per gram, about 50,000 hemoglobin units per gram and about 30,000 gelatin viscosity units per gram and having an amylolytic activity of approximately 3,500 SKB units per gram and 9,500 starch liquefaction units per gram and characterized by having a ratio of casein unit activity to hemoglobin unit activity of not less than 1:3 and a ratio of SKB unit activity to starch liquefaction unit activity of not less than 1:2.

11. A toothpaste comprising about 40 to 60% of abrasive agents, about 20 to 30% excipients, about 0.5 to 3% thickening agents, about 0.5 to 5% detergents, about 20 to 30% water, flavoring agents and about 0.1 to 6% by weight based upon single strength activity of enzyme products produced by inoculating a moist nutrient medium with a heavily sporulated culture of *Aspergillus oryzae*, and maintaining said inoculated medium at a suitable temperature for a suitable period of time and separating therefrom enzyme products having proteolytic activity of not less than 2000 casein units per gram, not less than 10,000 hemoglobin units per gram, and not less than 25,000 gelatin viscosity units per gram and having an amylolytic activity of not less than 100 SKB units per gram and not less than 500 starch liquefaction units per gram and characterized by having a ratio of casein unit activity to hemoglobin unit activity of not less than 1:3 and a ratio of SKB unit activity to starch liquefaction unit activity of not less than 1:2.

12. A toothpaste comprising about 40 to 60% of abrasive agents, about 20 to 30% excipients, about 0.5 to 3% thickening agents, about 0.5 to 5% detergents, about 20 to 30% water, flavoring agents and about 0.4 to 4% by weight based upon single strength activity of enzyme products produced by inoculating a moist nutrient medium with a heavily sporulated culture or *Aspergillus oryzae*, and maintaining said inoculated medium at a suitable temperature for a suitable period of time and separating therefrom enzyme products having proteolytic activity of about 3,000 casein units per gram, about 50,000 hemoglobin units per gram and about 30,000 gelatin viscosity units per gram and having an amylolytic activity of approximately 3,500 SKB units per gram and 9,500 starch liquefaction units per gram and characterized by having a ratio of casein unit activity to hemoglobin unit activity of not less than 1:3 and a ratio of SKB unit activity to starch liquefaction unit activity of not less than 1:2.

13. A toothpaste comprising about 40 to 60% of abrasive agents, about 20 to 30% excipients, about 0.5 to 3% thickening agents, about 0.5 to 5% detergents, about 20 to 30% water, flavoring agents and about 0.4 to 4% by weight based upon single strength activity of enzyme products produced by inoculating a moist nutrient medium with a heavily sporulated culture of *Aspergillus oryzae*, and maintaining said inoculated medium at a suitable temperature for a suitable period of time and separating therefrom enzyme products having proteolytic activity of about 10,000 casein units per gram, about 40,000 hemoglobin units per gram and about 100,000 gelatin viscosity units per gram and having an amylolytic activity of about 150 SKB units per gram and about 850 starch liquefaction units per gram and characterized by having a ratio of casein unit activity to hemoglobin unit activity of not less than 1:3 and a ratio of SKB unit activity to starch liquefaction unit activity of not less than 1:2.

14. A toothpaste comprising about 40 to 60% of abrasive agents, about 20 to 30% excipients, about 0.5 to 3% thickening agents, about 0.5 to 5% detergents, about 20 to 30% water, flavoring agents and about 0.4 to 4% by weight based upon single strength activity of enzyme products produced by inoculating a moist nutrient medium with a heavily sporulated culture of *Aspergillus niger*, and maintaining said inoculated medium at a suitable temperature for a suitable period of time and separating therefrom enzyme products having proteolytic activity of about 3,000 casein units per gram, about 50,000 hemoglobin units per gram and about 30,000 gelatin viscosity units per gram and having an amylolytic activity of approximately 3,500 SKB units per gram and 9,500 starch liquefaction units per gram and characterized by having a ratio of casein unit activity to hemoglobin unit activity of not less than 1:3 and a ratio of SKB unit activity to starch liquefaction unit activity of not less than 1:2.

15. A toothpaste comprising about 40 to 60% of abrasive agents, about 20 to 30% excipients, about 0.5 to 3% thickening agents, about 0.5 to 5% detergents, about 20 to 30% water, flavoring agents and about 0.4 to 4% by weight based upon single strength activity of enzyme products produced by inoculating a moist nutrient medium with a heavily sporulated culture of *Aspergillus niger*, and maintaining said inoculated medium at a suitable temperature for a suitable period of time and separating therefrom enzyme products having proteolytic activity of about 10,000 casein units per gram, about 40,000 hemoglobin units per gram and about 100,000 gelatin viscosity units per gram and having an amylolytic activity of about 150 SKB units per gram and about 850 starch liquefaction units per gram and characterized by having a ratio of casein unit activity to hemoglobin unit activity of not less than 1:3 and a ratio of SKB unit activity to starch liquefaction unit activity of not less than 1:2.

16. A toothpaste comprising about 40 to 60% of abrasive agents, about 20 to 30% excipients, about 0.5 to 3% thickening agents, about 0.5 to 5% detergents, about 20 to 30% water, flavoring agents, and about 0.1 to 6% by weight based upon single strength activity of enzyme products produced by inoculating a moist nutrient medium with a heavily sporulated culture of *Aspergillus niger*, and maintaining said inoculated medium at a suitable temperature for a suitable period of time and separating therefrom enzyme products having a proteolytic activity of not less than 2000 casein units per gram, not less than 10,000 hemoglobin units per gram, and not less than 25,000 gelatin viscosity units per gram and having an amylolytic activity of not less than 100 SKB units per gram and not less than 500 starch liquefaction units per gram and characterized by having a ratio of casein unit activity to hemoglobin unit activity of not less than 1:3 and a ratio of SKB unit activity to starch liquefaction unit activity of not less than 1:2.

References Cited by the Examiner

UNITED STATES PATENTS 1,386,252   8/21   Green _____ 167—93

OTHER REFERENCES

Howard: Journal of the Society of Cosmetic Chemists, vol. 13, No. 2, pages 59–63, February 1962.

Schatz et al.: Journal of the American Dental Association, vol. 65, No. 3, pages 368–374, September 1962.

Sreebny et al.: Jour. Amer. Dent. Assoc., vol. 53, pages 9–13, 1956.

Turner, Jour. Amer. Dent. Assoc., vol. 61, pages 920–31, 1960.

Zimmerman et al.: Handbook of Material Tradenames, Supplement III, published by Industrial Research Services Inc., Dover, N.H., 1960, page 210.

LEWIS GOTTS, *Primary Examiner.*